(12) United States Patent
Changryeol

(10) Patent No.: US 7,182,254 B2
(45) Date of Patent: Feb. 27, 2007

(54) VIRTUAL CARD SERVICE SYSTEM AND METHOD

(75) Inventor: Lee Changryeol, Seoul (KR)

(73) Assignee: Mquay Inc. (KR)

( * ) Notice: Subject to any disclaimer, the term of this patent is extended or adjusted under 35 U.S.C. 154(b) by 0 days.

(21) Appl. No.: 10/529,563

(22) PCT Filed: Sep. 25, 2003

(86) PCT No.: PCT/KR03/01952

§ 371 (c)(1),
(2), (4) Date: Mar. 28, 2005

(87) PCT Pub. No.: WO2004/029848

PCT Pub. Date: Apr. 8, 2004

(65) Prior Publication Data

US 2006/0163343 A1  Jul. 27, 2006

(30) Foreign Application Priority Data

Sep. 28, 2002  (KR)  ...................... 10-2002-0059073

(51) Int. Cl.
*G06K 5/00* (2006.01)

(52) U.S. Cl. ...................... 235/380; 235/379; 235/382; 235/382.5

(58) Field of Classification Search ................ 235/379, 235/380, 382, 382.5; 705/5, 30, 35, 42–43
See application file for complete search history.

(56) References Cited

U.S. PATENT DOCUMENTS

| | | | | |
|---|---|---|---|---|
| 5,943,624 A * | 8/1999 | Fox et al. | ................. | 455/556.1 |
| 5,953,710 A | 9/1999 | Fleming | | |
| 6,199,754 B1 * | 3/2001 | Epstein | ........................ | 235/379 |
| 6,250,557 B1 * | 6/2001 | Forslund et al. | ............. | 235/492 |
| 6,457,640 B2 * | 10/2002 | Ramachandran et al. | ... | 235/379 |
| 6,480,096 B1 * | 11/2002 | Gutman et al. | ............. | 340/5.31 |
| 6,526,273 B1 * | 2/2003 | Link et al. | .................... | 455/406 |
| 6,796,490 B1 * | 9/2004 | Drummond et al. | ......... | 235/379 |
| 6,823,172 B1 * | 11/2004 | Forrest | ....................... | 455/41.2 |
| 7,025,256 B1 * | 4/2006 | Drummond et al. | ......... | 235/379 |
| 2001/0051922 A1 * | 12/2001 | Waller et al. | .................. | 705/43 |
| 2002/0036231 A1 * | 3/2002 | Monaghan et al. | .......... | 235/381 |

(Continued)

FOREIGN PATENT DOCUMENTS

EP         0 829 813         3/1998

(Continued)

*Primary Examiner*—Kimberly D. Nguyen
(74) *Attorney, Agent, or Firm*—The Farrell Law Firm

(57) ABSTRACT

A virtual card service system and method are disclosed that include a mobile communication terminal for transmitting an amount of withdrawal money and a withdrawal term for a virtual cash card to the virtual card service system, a virtual cash card system for receiving the amount of withdrawal money and the withdrawal term from the mobile communication terminal, verifying whether the withdrawal money is deposited in a parent account corresponding to the virtual cash card, storing information on the amount of withdrawal money and withdrawing term if the withdrawal money is deposited in the parent account, and informing the mobile communication terminal of authentication, and an ATM for receiving a virtual cash card identifying information, verifying whether the information is within the withdrawal term stored in the virtual cash card system, and withdrawing the amount of withdrawal money from the parent account.

12 Claims, 14 Drawing Sheets

U.S. PATENT DOCUMENTS

2002/0062257 A1* 5/2002 Minamishin et al. ......... 705/26

FOREIGN PATENT DOCUMENTS

| JP | 06-282556 | 10/1994 |
| KR | 2000-37073 | 7/2000 |
| KR | 2000-50032 | 8/2000 |
| KR | 2001-77199 A | 8/2001 |
| KR | 2002-3261 | 1/2002 |
| WO | WO 00/49586 | 8/2000 |

* cited by examiner

US 7,182,254 B2

VIRTUAL CARD SERVICE SYSTEM AND METHOD

TECHNICAL FIELD

The present invention relates to a card service, and in particular, to a system and method of providing a virtual card service.

BACKGROUND ART

In general, a common card service includes a credit card service and a cash card service.

Explaining the credit card service in brief, the credit card reader reads information on the credit card presented by a client to pay the price of goods. The credit card reader provides a credit card company with the read information on the credit card and the information related to the payment inputted by an employee of a member shop to make a request for authentication. The credit card company performs the authentication based on the information on the credit card and the information related to the payment, and then informs of the authentication. If the authentication is normally performed, the credit card reader prints a sales slip of the credit card, and the client signs his/her name. If the signature is completed, the client receives one sheet of sales slip, so that the payment process using the credit card is completed.

Although the payment method using the credit card is widely used due to its convenience, a user is in danger, such as dual sale, using by stealth, loss or the like.

Explaining the cash card service in brief, an ATM reads the information on the cash card corresponding to a financial account, and provides a financial data base system with a password inputted by the client. The ATM performs the authentication based on the information on the cash card and the password, and then presents cash requested by the client from the account of the client and prints a detailed account.

Since many clients have to use the ATM for the cash card service, the cash card service needs an extended waiting time, and the password may be exposed.

Accordingly, the art demands the development of a card service in which its use is convenient and its security is excellent.

DISCLOSURE OF THE INVENTION

Therefore, an object of the present invention is to solve the problems involved in the prior art, and to provide a system and method of providing a virtual card service, in which a virtual card can withdraw an amount of money determined by a client, or can perform credit payment, within a term determined by the client, thereby preventing the card from being used by stealth or from being lost.

Another object of the present invention is to provide a system and method of providing a virtual card service, in which card identifying information for a virtual card is easily inputted to an ATM, thereby reducing a usage time of the ATM and minimizing exposure of personal information.

Still another object of the present invention is to provide a system and method of providing a virtual card service, in which security can be maintained by a virtual card and the virtual card can be easily used.

Still another object of the present invention is to provide a system and method of providing a virtual card service, in which security can be maintained by a virtual card and the virtual card can be easily used.

In order to accomplish the above mentioned objects, the present invention provides a virtual card service system comprising: a mobile communication terminal for transmitting an amount of withdrawal money and a withdrawing term for a virtual cash card to the virtual card service system; a virtual cash card system for receiving the amount of withdrawal money and the withdrawing term from the mobile communication terminal, verifying whether the withdrawal money is deposited in a parent account corresponding to the virtual cash card, storing information on the amount of withdrawal money and withdrawing term if the withdrawal money is deposited in the parent account, and informing the mobile communication terminal of authentication; and an ATM for receiving a virtual cash card identifying information, verifying whether the information is within the withdrawing term stored in the virtual cash card system, and withdrawing the amount of withdrawal money from the parent account.

It is to be understood that both the foregoing general description and the following detailed description of the present invention are exemplary and explanatory and are intended to provide further explanation of the present invention as claimed.

BRIEF DESCRIPTION OF THE DRAWINGS

The above objects, other features and advantages of the present invention will become more apparent by describing the preferred embodiment thereof with reference to the accompanying drawings, in which.

BEST MODE FOR CARRYING OUT THE INVENTION

Reference will now be made in detail to the preferred embodiments of the present invention; examples of which are illustrated in the accompanying drawings.

Figure 1:
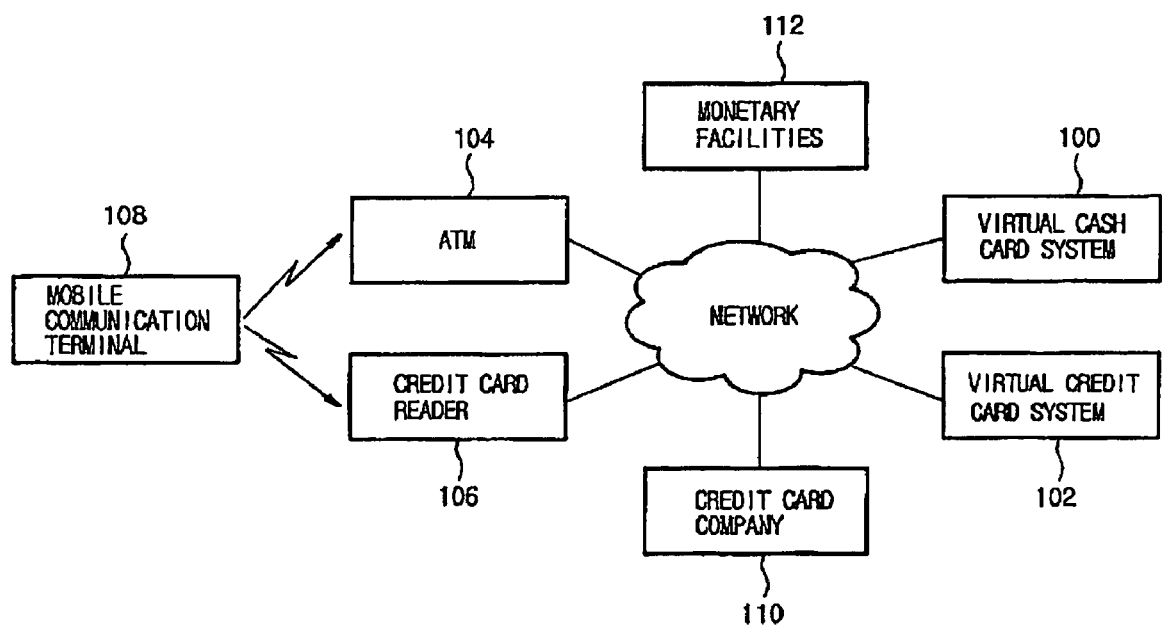
FIG. 1 is a schematic view of a system of providing a virtual card service according to a preferred embodiment of the present invention.

A virtual card service system according to a preferred embodiment of the present invention provides a virtual cash card service and a virtual credit card service. FIG. 1 is a schematic view of the virtual card service system.

The virtual cash card system 100 regulates an amount of withdrawal money and a withdrawing term of a virtual cash card connected with a parent account according to a request of a client who communicates with the virtual cash card system via a mobile communication terminal 108. The virtual cash card system 100 authenticates the client through the virtual cash card, and allows an ATM 104 to provide the client with the withdrawal money within the withdrawing term. The virtual cash card system 100 is connected to monetary banking facilities 112 via a network in order to inquire for a deposit of the parent withdrawing account or to restrict the withdrawing. The ATM 104 provides the virtual cash card service according to the preferred embodiment of the present invention, as well as providing a common financial automatization service.

Figure 2:
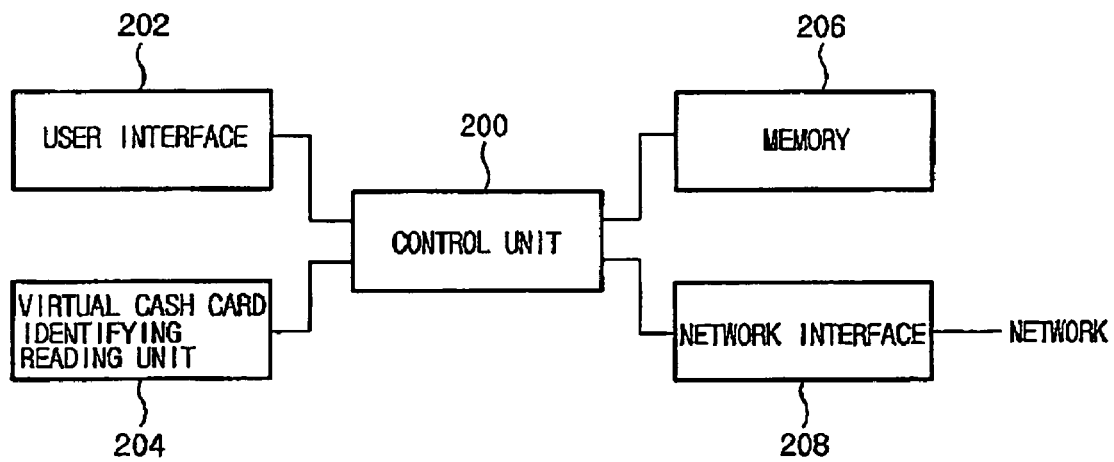
FIG. 2 is a schematic view of an ATM according to a preferred embodiment of the present invention.

Referring to FIG. 2 indicating a block diagram of the ATM 104, the ATM 104 includes a control unit 200 for providing the common financial automatization service and the virtual cash card service, a user interface 202 for interfacing between the client and the control unit 200 via a key pad or a touch panel, a virtual cash card identifying information reading unit 204 for reading virtual cash card identifying information stored in the mobile communication terminal 108, a memory 206 for storing a processing program of the control unit 200 and various set information, and a network interface 208 for interfacing between the monetary facilities and the virtual cash card system 100 via a network.

The mobile communication terminal 108 can infrared-transmit the virtual cash card identifying information to the ATM 104, wherein the virtual cash card identifying information reading unit 204 is an infrared receiver. A bar-code corresponding to the virtual cash card identifying information may be attached to a proper position of the mobile communication terminal 108, wherein the virtual cash card identifying information reading unit 204 may be a bar-code reader. A magnetic tape recording the virtual cash card identifying information may be recorded on a proper position of the mobile communication terminal 108, wherein the virtual cash card identifying information reading unit 204 may be a card reader. An IC chip recording the virtual cash card identifying information may be attached to a proper position of the mobile communication terminal 108, wherein the virtual cash card identifying information reading unit 204 may be an IC chip reader.

The virtual credit card system 102 regulates an amount of purchase money and a purchasing term of a virtual credit card connected with a parent credit card according to a request of the client who communicates with the virtual credit card system via the mobile communication terminal 108. The virtual credit card system 102 authenticates the client through the virtual credit card to pay the purchase money within the purchasing term through a credit card paying unit 106.

Figure 3:
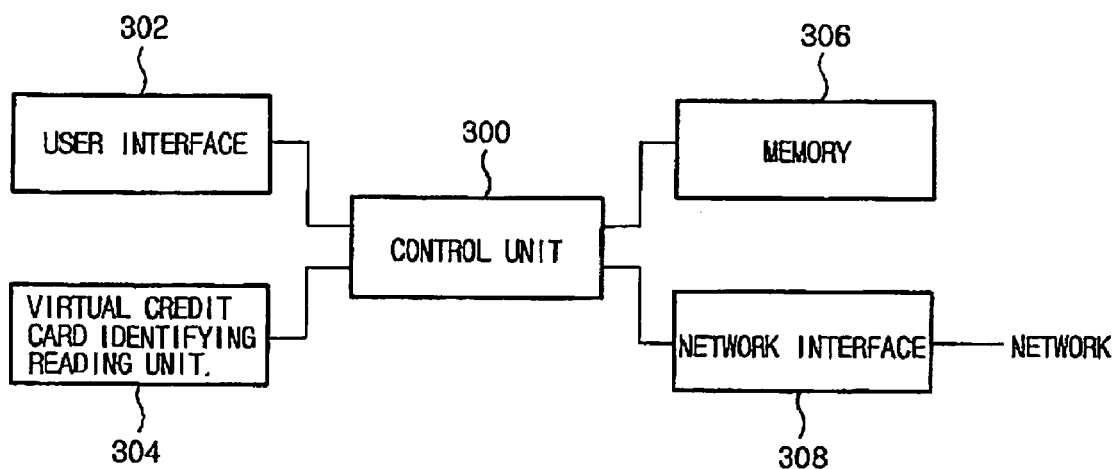
FIG. 3 is a schematic view of a credit card reader according to a preferred embodiment of the present invention.
Figure 4:
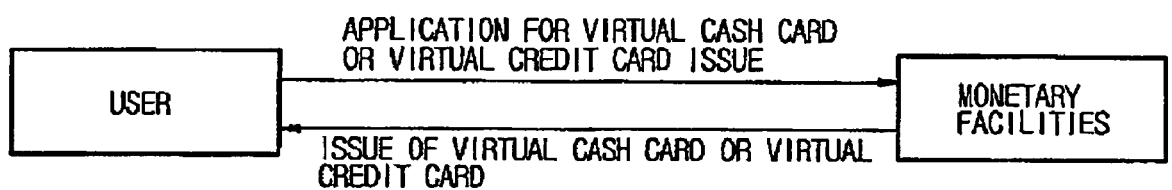
FIG. 4 is a view indicating a process for issuing a virtual card according to a preferred embodiment of the present invention.

The credit card paying unit 106 provides a common credit card paying service and a virtual credit card service according to the preferred embodiment of the present invention. Referring to FIG. 3 indicating a block diagram of the credit card paying unit 106, the credit card paying unit 106 includes a control unit 300 for providing the common credit card paying service and the virtual credit card service, a user interface 302 for interfacing between a client of a member shop and the control unit 300 via a key pad or a touch panel, a virtual credit card identifying information reading unit 304 for reading virtual credit card identifying information stored in the mobile communication terminal 108, a memory 306 for storing a processing program of the control unit 300 and various set information, and a network interface 308 for interfacing between a credit card company 110 and the virtual credit card system 102 via a network.

The mobile communication terminal 108 can infrared-transmit the virtual credit card identifying information to the credit card paying unit 106, wherein the virtual credit card identifying information reading unit 304 is an infrared receiver. A bar-code corresponding to the virtual credit card identifying information may be attached to a proper position of the mobile communication terminal 108, wherein the virtual credit card identifying information reading unit 304 may be a bar-code reader. A magnetic tape recording the virtual credit card identifying information may be recorded on a proper position of the mobile communication terminal 108, wherein the virtual credit card identifying information reading unit 304 may be a card reader. An IC chip recording the virtual credit card identifying information may be attached to a proper position of the mobile communication terminal 108, wherein the virtual credit card identifying information reading unit 304 may be an IC chip reader.

The mobile communication terminal 108 includes set programs and information to receive the virtual cash card service or the virtual credit card service according to the preferred embodiment of the present invention. In addition, the mobile communication terminal 108 provides the ATM 104 with the virtual cash card identifying information, or provides the credit card paying unit 106 with the virtual credit card identifying information. A method of providing the virtual cash card identifying information or the virtual credit card identifying information utilizes an infrared communication, a bar-code, a magnetic tape or an IC chip.

A virtual card service method according to one preferred embodiment of the present invention applicable to the virtual card service system will now be described in detail.

First, in order to utilize the virtual card service according to the preferred embodiment of the preset invention, the client files the application for the virtual cash card or the virtual credit card with the monetary facilities. The monetary facilities provide the client with the virtual cash card or the virtual credit card in response to the application of the client.

The information necessary for providing the virtual cash card service may include a client's ID, the virtual cash card identifying information, a parent account number, an available term of the parent account, an amount of the withdrawal money, a withdrawing term, a password and so forth. The client's ID and the virtual cash card identifying information are shared with the mobile communication terminal 108 and the virtual cash card system 100. The parent account number, the available term of the parent account and the password are registered in the virtual cash card system 100. The amount of withdrawal money and the withdrawing term are shared with the mobile communication terminal 108 and the virtual cash card system 100, only when the client utilizes the service. The information necessary for providing the virtual credit card service may include a client's ID, the virtual credit card identifying information, a parent credit card number, an available term of the parent credit card, an amount of the purchase money, the purchasing term, a password, a member shop number and so forth. The client's ID and the virtual credit card identifying information are shared with the mobile communication terminal 108 and the virtual credit card system 102. The parent credit card number, the available term of the parent credit card and the password are registered in the virtual credit card system 102. The amount of purchase money, the purchasing term and the member shop number are shared with the mobile communication terminal 108 and the virtual credit card system 102, only when the client utilizes the service.

When the monetary facilities give the virtual cash card or the virtual credit card to the client, they directly provide the mobile communication terminal of the client with the virtual cash card identifying information or the virtual credit card identifying information, or can attach the bar-code, the magnetic tape or the IC chip, in which the virtual cash card identifying information or the virtual credit card identifying information is recorded, to the mobile communication terminal of the client.

Figure 5:
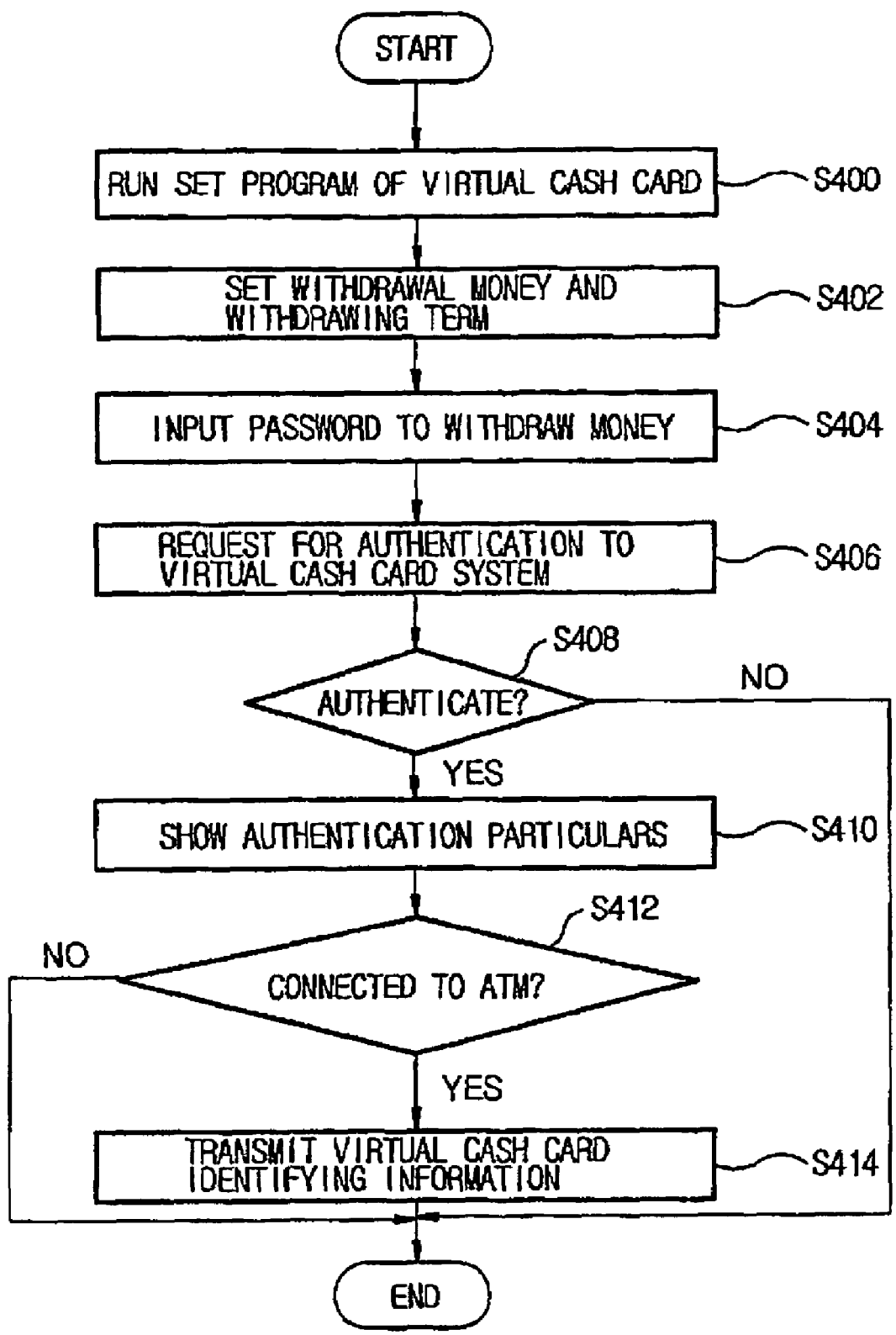
FIGS. 5 to 7 are flowcharts showing a method of providing a virtual cash card service according to a preferred embodiment of the present invention.
Figure 6:
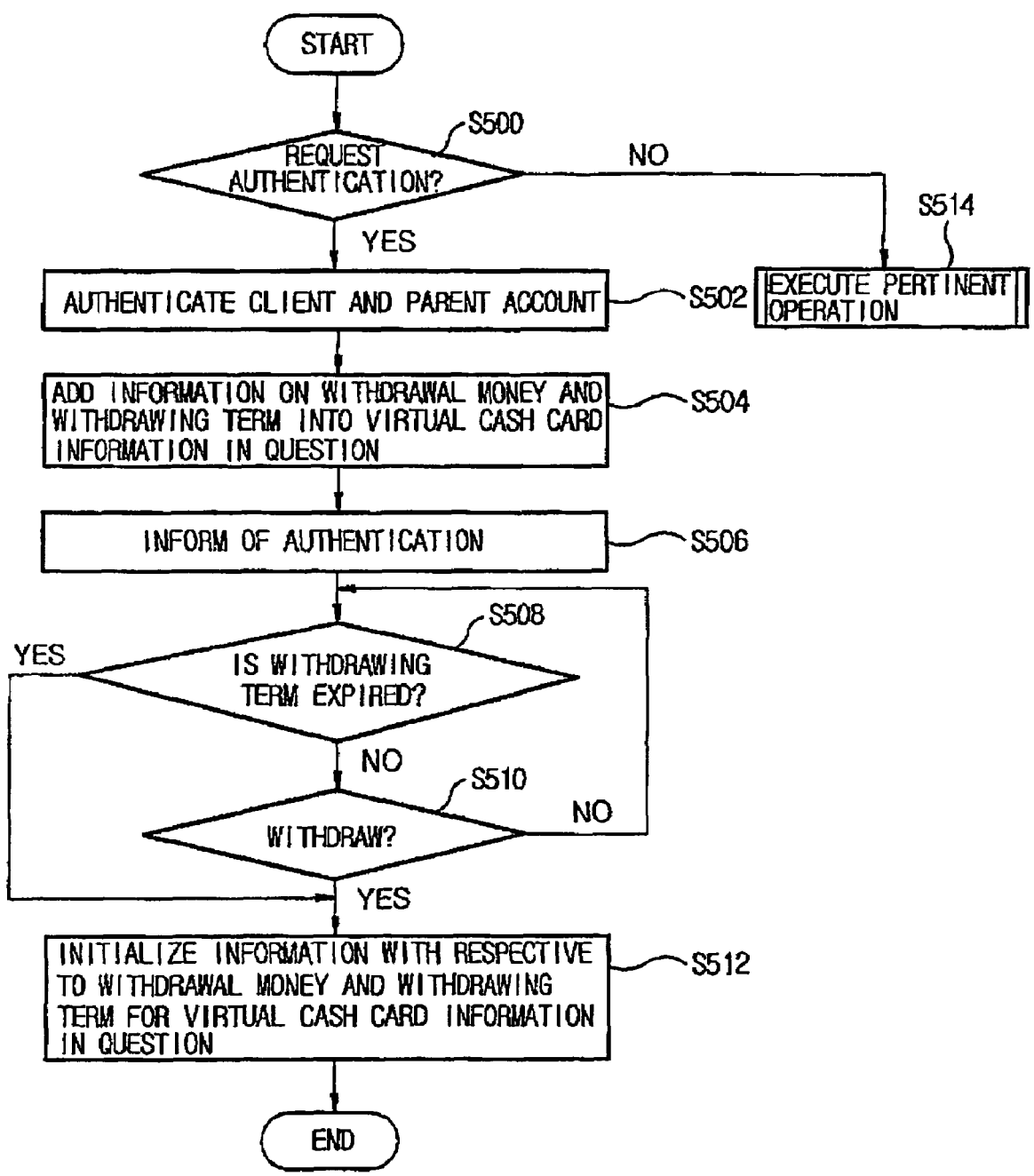

The method of servicing the virtual cash card will now be described with reference to FIGS. 5 to 7. The client wanting to receive the virtual cash card service runs the virtual cash card set program of the mobile communication terminal 108 to set the amount of withdrawal money and the withdrawing term, and then inputs the password (steps S400 to S404). The mobile communication terminal 108 transmits the amount of withdrawal money, the withdrawing term, the password and the virtual cash card identifying information which are inputted by the client to the virtual cash card system 100, and makes a request for authentication (step S406). If the virtual cash card system 100 informs the mobile communication terminal 108 of the authentication after requesting the authentication, the mobile communication terminal 108 displays that the client may verify authentication particulars (steps S408 and S410).

If the mobile communication terminal 108 is adapted to transmit the virtual cash card identifying information via the infrared communication, when the mobile communication terminal 108 is connected to the ATM 104, the mobile communication terminal transmits the virtual cash card identifying information to the ATM 104 (steps S412 and S414).

The process of the virtual cash card system 100 according to the authentication request of the mobile communication terminal 108 will now be described with reference to FIG. 6.

Figure 8:
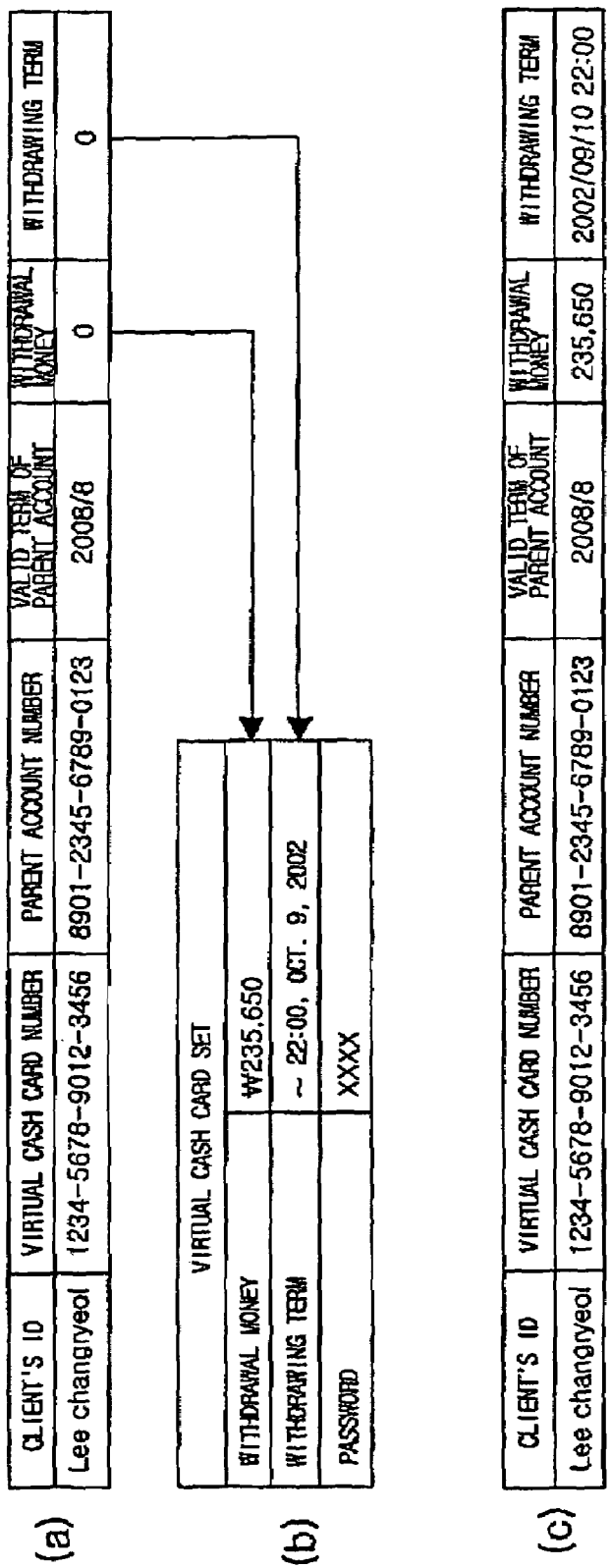
FIG. 8 is a view indicating a process of processing virtual cash card information according to a preferred embodiment of the present invention.

If the mobile communication terminal 108 makes a request for authentication (step S500), the virtual cash card system 100 authenticates the virtual cash card identifying information on the interested client, and connects to the monetary facilities 112 to verify whether an amount of money to be withdrawn is deposited in the parent account corresponding to the virtual cash card of the client (step S502). If the amount of money to be withdrawn has been deposited in the parent account, the virtual cash card system 100 adds the information on the amount of withdrawal money and withdrawing term into the information on the interested virtual cash card (step S504). The information on the virtual cash card service system 100 includes the client's ID, the virtual cash card identifying information, the parent account number, the available term of the parent account, the amount of the withdrawal money, the withdrawing term, and the password, as shown in FIG. 8a. The withdrawal money and the withdrawing term are initialized to zero. If the withdrawal money and the withdrawing term are provided upon requesting authentication, as shown in FIG. 8b, the virtual cash card system 100 adds the withdrawal money and the withdrawing term into the information on the virtual cash card, as shown in FIG. 8c.

If the information on the virtual cash card is provided with the withdrawal money and the withdrawing term, the virtual cash card system 100 requests the monetary facilities 112 that the withdrawal money is not withdrawn from the parent account via other medium during the withdrawing term.

As described above, after the withdrawal money and the withdrawing term are added into the information on the virtual cash card, the virtual cash card system 100 informs the mobile communication terminal 108 of the authentication (step S506). Then, if the withdrawal money is withdrawn within the withdrawing term, the virtual cash card system 100 initializes the information with respective to the withdrawal money and withdrawing term. Even if the withdrawing term has expired and the withdrawal money is not withdrawn, the virtual cash card system 100 initializes the information with respective to the withdrawal money and withdrawing term of the virtual cash card. The virtual cash card system 100 initializes the information with respective to the withdrawal money and withdrawing term of the virtual cash card identifying information, and simultaneously, requests the monetary facilities 112 to cancel the withdrawing restriction of the parent account (steps S508 to 512).

Figure 7:
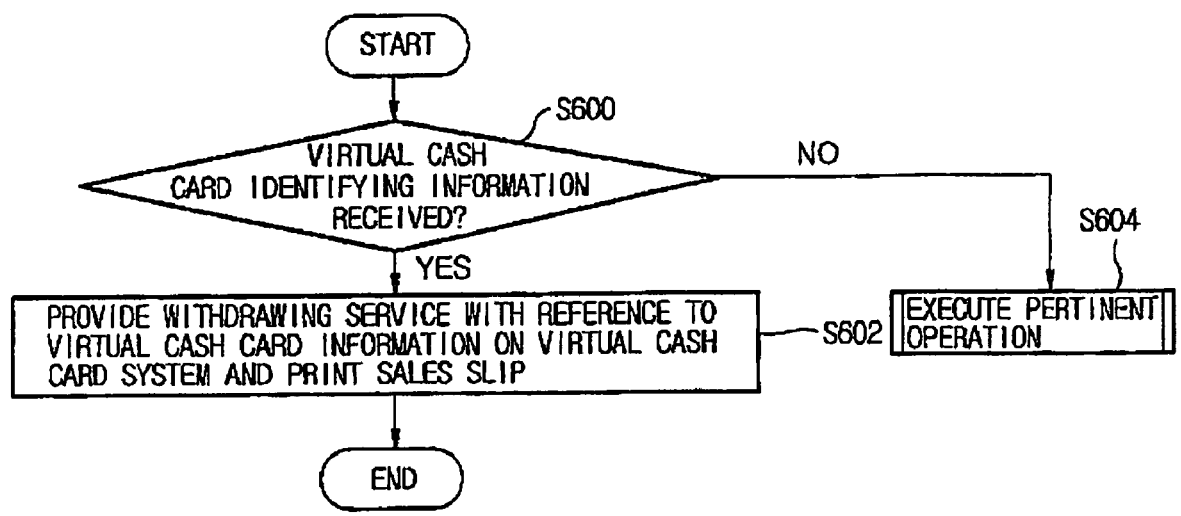

Explaining the process of the ATM 104 according to the preferred embodiment of the present invention with reference to FIG. 7, if the ATM 104 receives the virtual cash card identifying information within the withdrawing term predetermined by the client (step S600), the ATM 104 verifies whether the effective term is within the withdrawing term of the interested virtual cash card with reference to the information on the virtual cash card of the virtual cash card system 100. If yes, the ATM provides the client with the withdrawing service and outputs a record sheet of the transaction (step S602). The virtual cash card identifying information may be inputted through the virtual cash card identifying information reading unit 204 or by key manipulation by the user.

Figure 9:
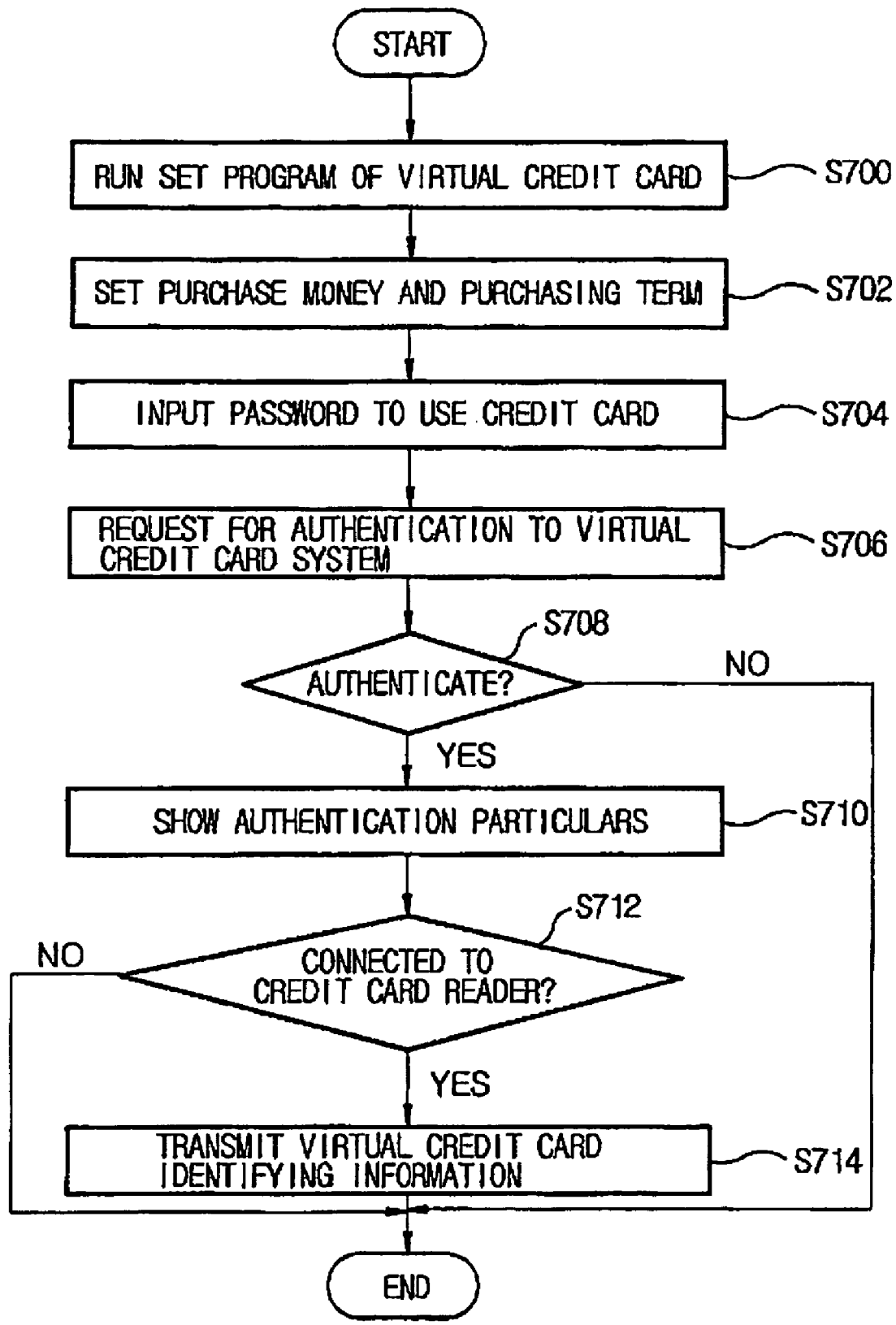
FIGS. 9 to 11 are flowcharts showing a method of providing a virtual credit card service according to a preferred embodiment of the present invention.
Figure 10:
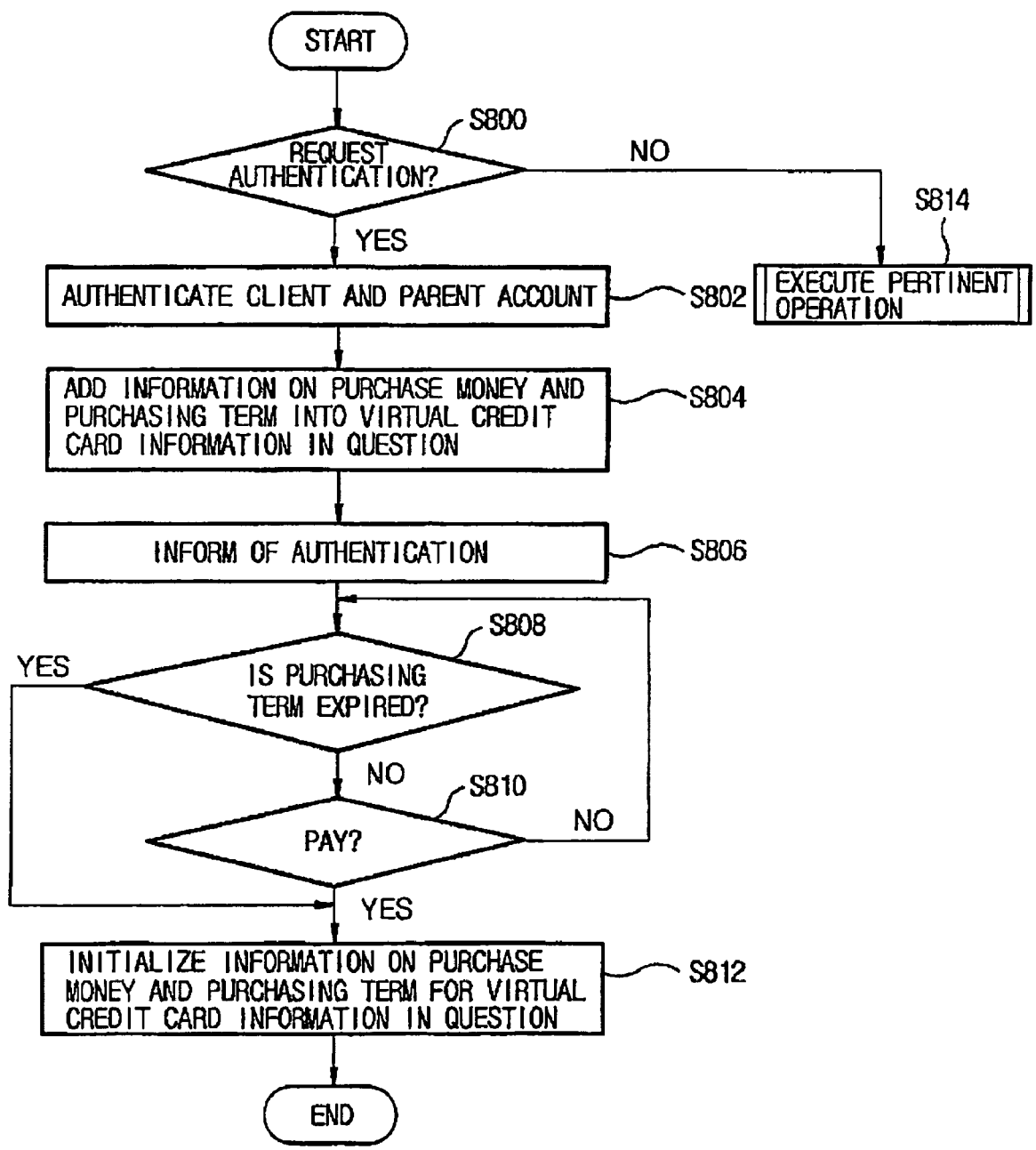

The method of servicing the virtual credit card will now be described with reference to FIGS. 9 to 11.

The client of the virtual credit card runs the virtual credit card set program of the mobile communication terminal 108 to set the amount of purchase money and the purchasing term, and then inputs the password (steps S700 to 704). The mobile communication terminal 108 transmits the amount of purchase money, the purchasing term, the password and the virtual credit card identifying information to the virtual credit card system 102, and makes a request for authentication (step S706). If the virtual credit card system 102 informs the mobile communication terminal 108 of the authentication after requesting the authentication, the mobile communication terminal 108 display that the client may verify authentication particulars (steps S708 and S710).

If the mobile communication terminal 108 is adapted to transmit the virtual cash card via the infrared communication, when the mobile communication terminal 108 is connected to the ATM 104, the mobile communication terminal transmits the virtual cash card to the ATM 104 (steps S712 and S714).

The process of the virtual credit card system 102 according to the authentication request of the mobile communication terminal 108 will now be described with reference to FIG. 10.

Figure 12:
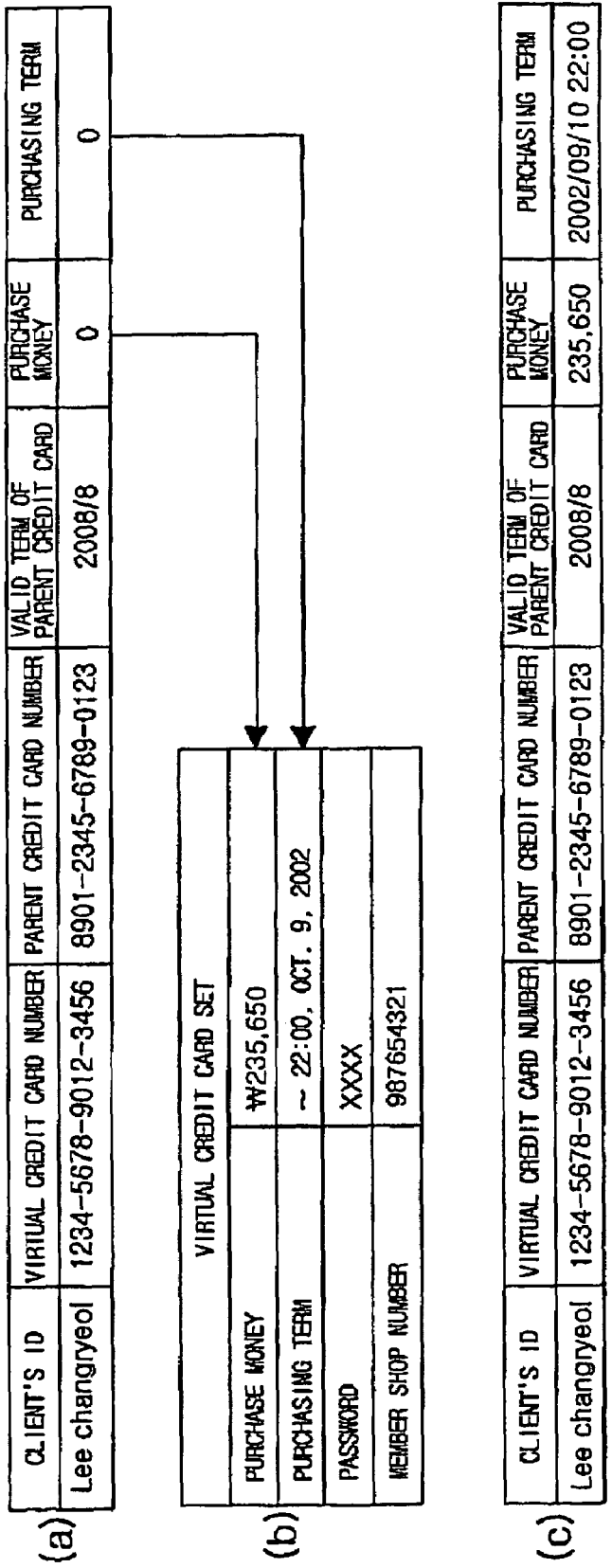
FIG. 12 is a view indicating a process for processing virtual credit card information according to a preferred embodiment of the present invention.

If the mobile communication terminal 108 makes the request for authentication (step S800), the virtual credit card system 102 authenticates the virtual credit card identifying information on the interested client, and connects to the credit card company 110 to perform the authentication of the parent credit card corresponding to the virtual credit card of the client (step S802). The virtual credit card system 100 adds the information on the amount of purchase money and purchasing term into the information on the virtual credit card (step S804). The information on the virtual credit card service system 102 includes the client's ID, the virtual credit card identifying information, the parent credit card number, the available term of the parent credit card, the amount of purchase money, and the purchasing term, as shown in FIG. 12a. The purchase money and the purchasing term are initialized to zero. If the purchase money and the purchasing term are provided upon requesting the authentication, as shown in FIG. 12b, the virtual credit card system 102 adds the purchase money and the purchasing term into the information on the virtual credit card, as shown in FIG. 12c.

If the information on the virtual credit card is provided with the purchase money and the purchasing term, the virtual credit card system 102 informs the mobile communication terminal 108 of the authentication (step S806). Then, if the purchase money is paid within the purchasing term, the virtual credit card system 102 initializes the information on the purchase money and purchasing term of the virtual credit card. Even if the purchase money is not paid and the purchasing term is expired, the virtual credit card system 100 initializes the information with respective to the purchase money and purchasing term of the virtual credit card identifying information.

Figure 11:
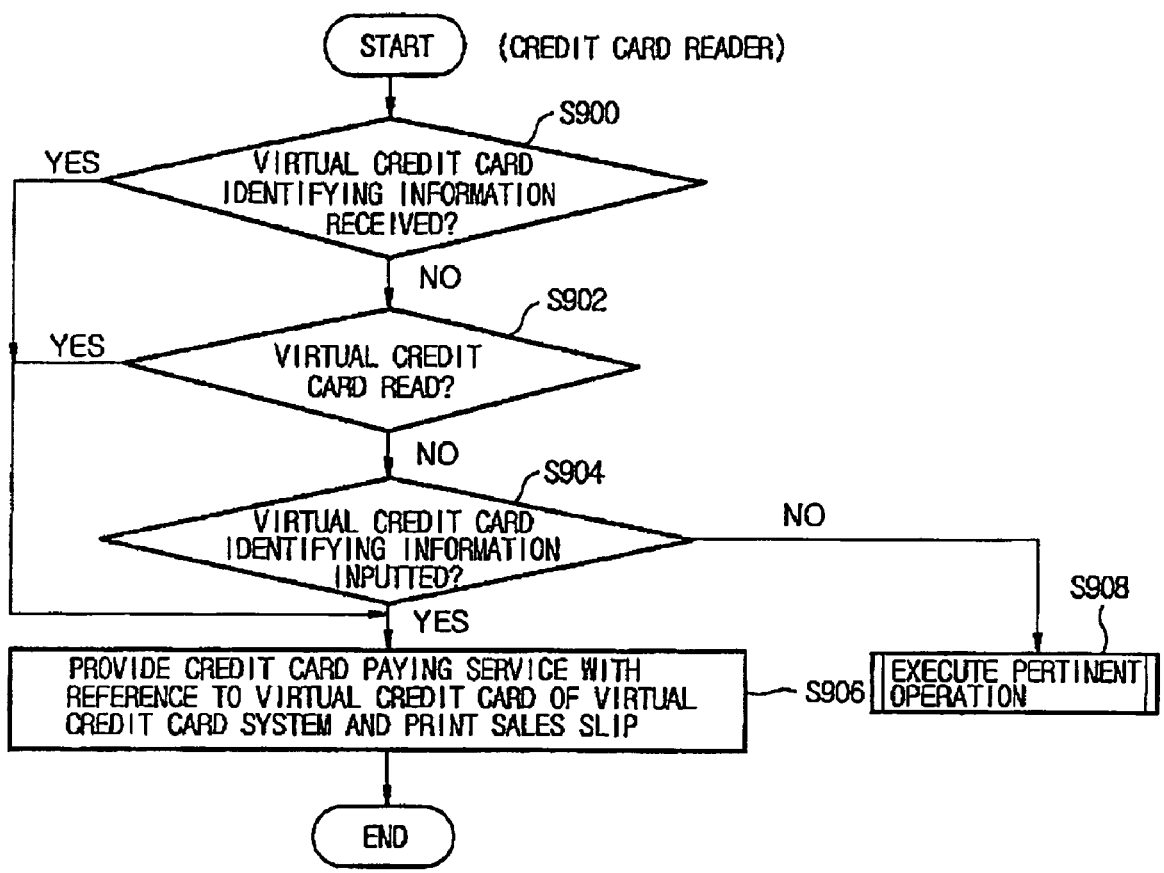

Explaining the process of the credit card reader 106 according to the preferred embodiment of the present invention with reference to FIG. 11, if the credit card reader 106 receives the virtual credit card identifying information within the purchasing term predetermined by the client (step S900), reads the virtual credit card of a plastic card (step S900), or receives the virtual credit card identifying information (step S904), the credit card reader 106 verifies whether the effective term is within the purchasing term of the interested credit card with reference to the virtual credit card information on the virtual credit card system 102. If yes, the credit card reader provides the card paying service corresponding to the interested purchase money and outputs a record sheet of the transaction (step S906).

Figure 13:
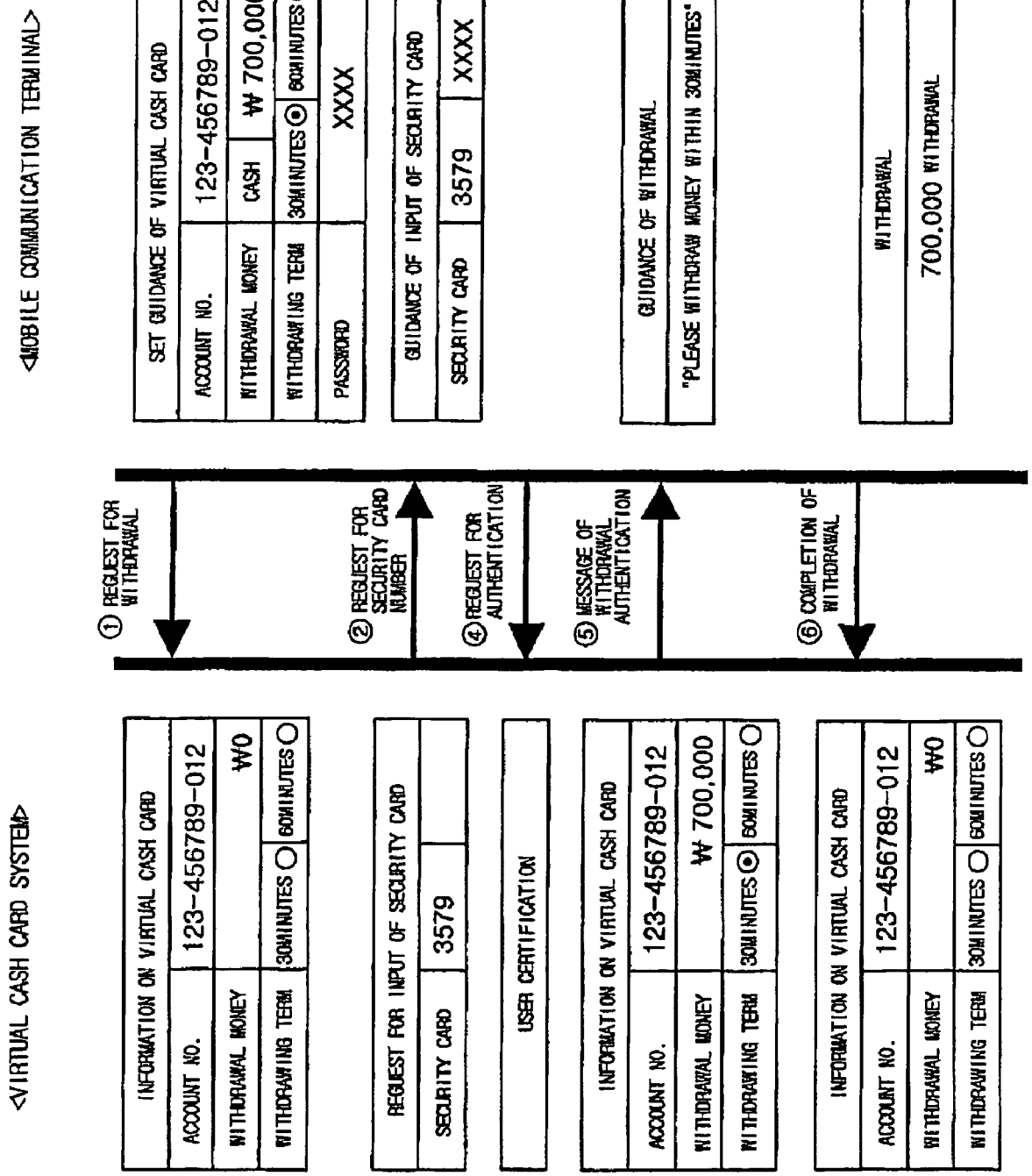
FIGS. 13 to 15 are views indicating a process of a virtual card service according to a preferred embodiment of the present invention.

The process of servicing the virtual cash card according to one preferred embodiment of the present invention will now be described from the standpoint of the client with reference to FIG. 13.

The client sets the withdrawal money and withdrawing term of the virtual cash card with reference to the virtual cash card setting guidance displayed on a display window of the mobile communication terminal, and inputs the password of the account to request the virtual cash card system to withdraw the money. In response to the request for withdrawal, the virtual cash card system requests from the client the number of the security card, and then the client inputs the number of security card by use of the mobile communication terminal. The mobile communication terminal transmits the number of the security card inputted by the client, and the virtual cash card system performs the user certification through the number of the security card. If the user certification is successful, the virtual cash card system adds the amount of withdrawal money and the withdrawing term into the virtual cash card, and provides the mobile communication terminal with a message of authentication certification. The mobile communication terminal displays that the client may withdraw the amount of the withdrawal money within the withdrawing term in response to the certification.

If the client inputs the virtual cash card identifying information in question into the ATM to withdraw the money, the virtual cash card system initializes the amount of withdrawal money and the withdrawing term among the information on the virtual cash card.

Figure 14:
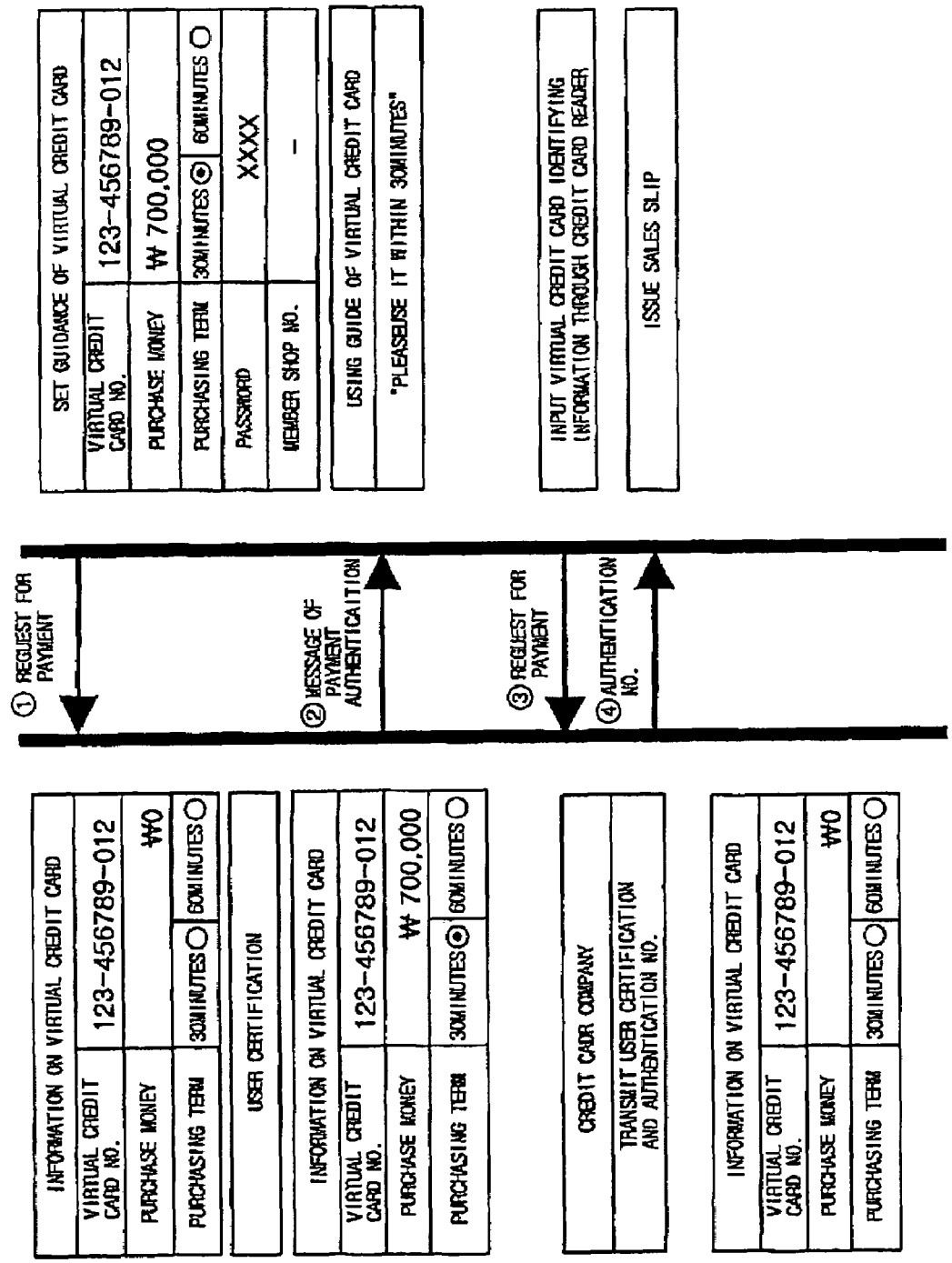
Figure 15:
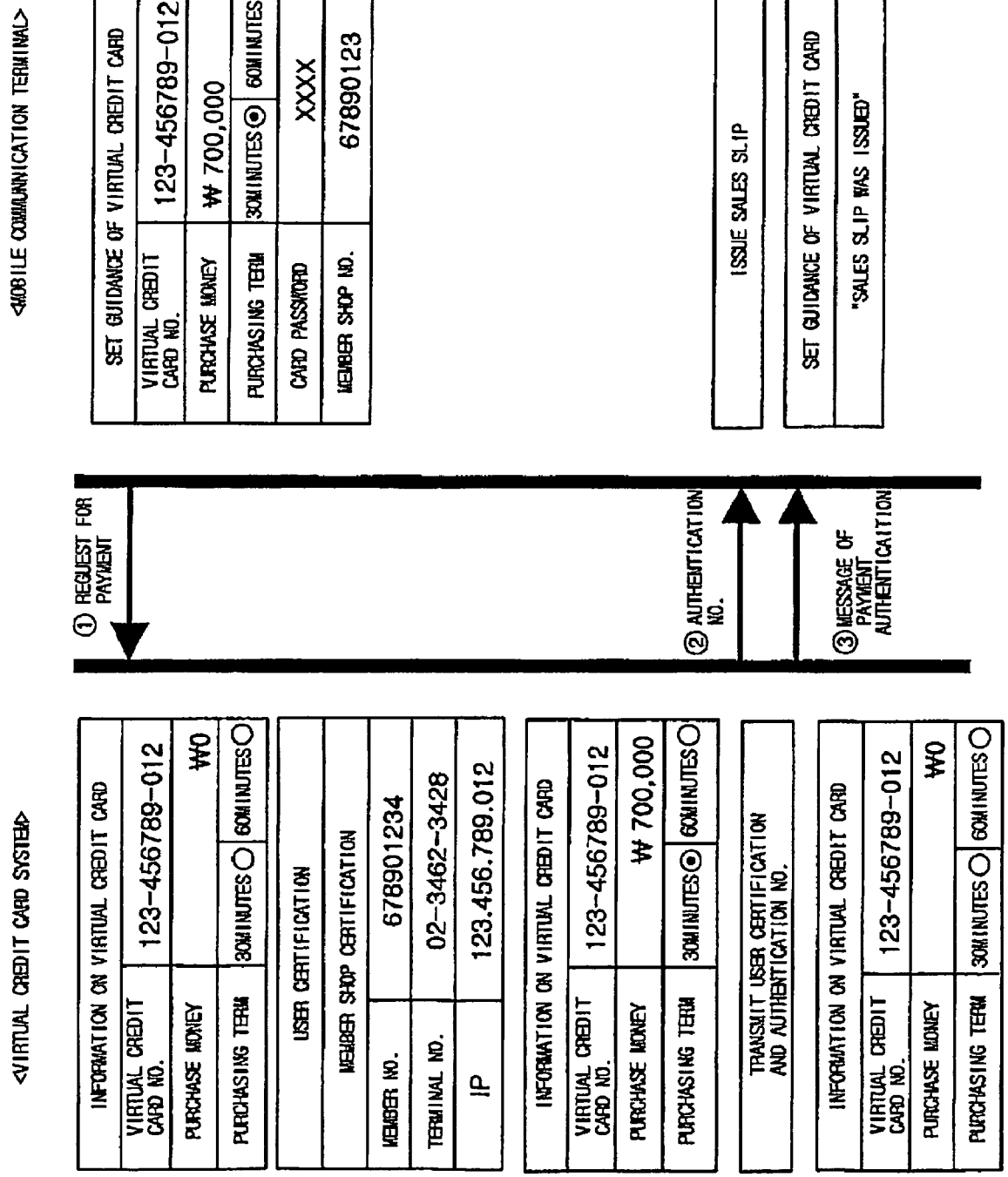

The process of servicing the virtual credit card according to one preferred embodiment of the present invention will now be described from the standpoint of the client with reference to FIGS. 14 and 15.

The client inputs the amount of purchase money, the purchasing term, and the password by use of the mobile communication terminal to request the virtual credit card system to pay the purchase. The virtual credit card system performs the certification for the client according to the payment request. If the certification is successful, the amount of purchase money and purchasing term selected by the client are added to the virtual credit card information, and the mobile communication terminal displays that the client may use the virtual credit card. If the client requests payment through the credit card reader within the purchasing term, the virtual credit card system connects to the credit card company to obtain the user certification and the certification number for the parent credit card and thus provide the credit card reader with them. The credit card reader provided with the certification number prints a sales slip. The virtual credit card system initializes the amount of purchase money and purchasing term of the virtual credit card information, after the transmission of the certification number is completed.

Meanwhile, in order to designate a member shop to receive virtual credit card service, the client inputs the amount of purchase money, the purchasing term, the password, and member shop's number by use of the mobile communication terminal to request the virtual credit card system to pay the purchase. The virtual credit card system performs the certification for the client and the member shop according to the payment request. If the certification is successful, the amount of purchase money and purchasing term selected by the client are added to the virtual credit card information, and the virtual credit card system requests the credit card company to transmit the user certification and the certification number. If the certification number is provided from the credit card company, the virtual credit card system provides the interested member shop with the certification number. The credit card reader provided with the certification number prints a sales slip. The virtual credit card system initializes the amount of purchase money and purchasing term of the virtual credit card information, after the transmission of the certification number is completed.

Figure 16:
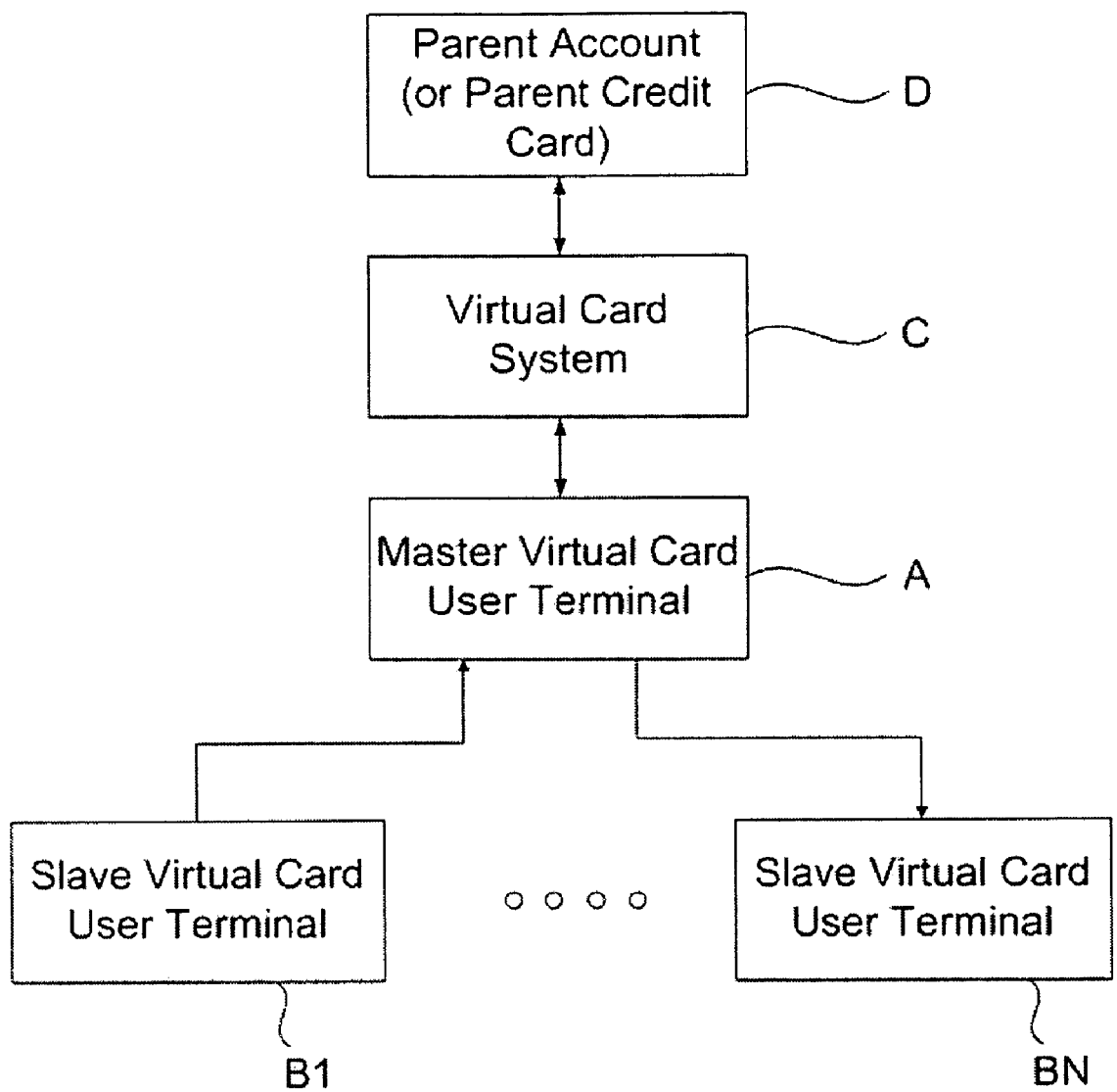
FIG. 16 is a view indicating a process for servicing a plurality of virtual cards according to a preferred embodiment of the present invention.

Contrary to the above embodiment, one parent account or one parent credit card may be provided with a plurality of virtual cards, which will be described with reference to FIG. 16.

A master virtual card user terminal A and a plurality of slave virtual card user terminals B1 to BN are supplied with one or more virtual cards, respectively. The master virtual card user terminal A is connected to the plurality of slave virtual card user terminals B1 to BN. In response to the request of many slave virtual card user terminals B1 to BN, the user of the master virtual card user terminal A selects an amount of usage money and a using term for any one of the plurality of slave virtual cards, and asks the virtual card system C to request authentication. Upon request, the virtual card system C certifies the parent account or parent credit card of the master card. If the certification is successful, the virtual card system C stores an amount of usage money and the using term in the information on the selected slave virtual card among the plurality of slave virtual cards, and then informs the master virtual card user terminal A and the selected slave virtual card user terminal of the certification.

After informing of the authentication, if the identifying information on the selected slave virtual card is inputted to the credit card reader or the ATM within the using term, the credit card is paid or the withdrawal is carried out.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers all modifications and variations of this invention that come within the scope of the appended claims and their equivalents.

INDUSTRIAL APPLICABILITY

With the above description, according to the present invention, the virtual card can withdraw an amount of money determined by the client, or can pay by credit, within a term determined by the client, thereby preventing the card from being used by stealth or from being lost. Further, the card identifying information for the virtual card is easily inputted to an ATM, thereby reducing the usage time of the ATM and minimizing exposure of personal information.

In addition, the present invention has another advantage in that security can be maintained by the virtual card and the virtual card can be easily used.

The invention claimed is:

1. A virtual card service system comprising:
a mobile communication terminal for transmitting an amount of withdrawal money and a withdrawing term for a virtual cash card to the virtual card service system;
a virtual cash card system for receiving the amount of withdrawal money and the withdrawing term from the mobile communication terminal, verifying whether the withdrawal money is deposited in a parent account corresponding to the virtual cash card, storing information on the amount of withdrawal money and withdrawing term if the withdrawal money is deposited in the parent account, and informing the mobile communication terminal of authentication; and
an ATM for receiving a virtual cash card identifying information, verifying whether the information is within the withdrawing term stored in the virtual cash card system, and withdrawing the amount of withdrawal money from the parent account;
wherein, if the amount of withdrawal money and the withdrawing term are provided from the terminal, the virtual cash card system adds the amount of withdrawal money and the withdrawing term into information on a virtual cash card of which an amount of withdrawal money and a withdrawing term are initialized, and initializes the amount of withdrawal money and the withdrawing term of the virtual cash card information, if the amount of withdrawal money is withdrawn within the withdrawing term or the withdrawing term is expired.

2. The virtual card service system as claimed in claim 1, wherein if a withdrawal request is not performed through the virtual cash card identifying information, the virtual cash card system requests monetary facilities so that the stored amount of withdraw money is not withdrawn from the parent account during the stored withdraw term.

3. The virtual card service system as claimed in claim 1, wherein the virtual cash card identifying information is input through a wireless communication of the terminal, is read from a bar-code, a magnetic tape or an IC chip, which are attached to the terminal, or is input by a key input of a client.

4. A virtual card service system comprising:
a mobile communication terminal for transmitting an amount of purchase money and a purchasing term for a virtual credit card to the virtual card service system;
a virtual credit card system for receiving the amount of purchase money and the purchasing term from the mobile communication terminal, authenticating a parent credit card corresponding to the virtual credit card, storing information on the amount of purchase money and purchasing term if the authentication is successful, and informing the mobile communication terminal of the authentication; and
a credit card reader for receiving a virtual credit card identifying information, verifying whether the information is within the purchasing term stored in the virtual credit card system, and paying the amount of purchase money using the parent credit card,
wherein if the amount of purchase money and the purchasing term are provided from the terminal; the virtual credit card system adds the amount of purchase money and the purchasing term into information on a virtual credit card of which an amount of purchase money and a purchasing term are initialized, and initializes the amount of purchase money and the purchasing term of the virtual credit card information, if the amount of purchase money is withdrawn within the purchasing term or the purchasing term is expired.

5. The virtual card service system as claimed in claim 4, wherein the virtual credit card identifying information is input through a wireless communication of the terminal, is read from a bar-code, a magnetic tape or an IC chip, which are attached to the terminal, or is input by a key input of a client.

6. A virtual card service method comprising the steps of:
transmitting an amount of withdrawal money and a withdrawing term for a virtual cash card to a virtual cash card system through a user terminal;
if the amount of withdrawal money and the withdrawing term are provided to the virtual cash card system, verifying whether the withdrawal money is deposited in a parent account corresponding to the virtual cash card, storing infonnation on the amount of withdrawal money and withdrawing term if the withdrawal money is deposited in the parent account, and informing the user terminal of authentication; and
if a virtual cash card identifying information is inputted to an ATM after informing of the authentication, verifying whether the information is within the stored withdrawing term, and withdrawing the amount of withdrawal money from the parent account if the information is within the stored withdrawing term.

7. A virtual card service method comprising the steps of:
transmitting an amount of purchase money and a purchasing term for a virtual credit card system through a user terminal;
if the amount of purchase money and the purchasing term are provided to the virtual credit card system, authenticating a parent credit card corresponding to the virtual credit card, storing information on the amount of purchase money and purchasing term if the authentication is successful, and informing the user terminal of the authentication; and
if a virtual credit card identifying information is inputted to a credit card reader, verifying whether the information is within the purchasing term stored in the virtual credit card system, and paying the amount of purchase money using the parent credit card.

8. A virtual card service method comprising the steps of:

transmitting an amount of purchase money and a purchasing term for a virtual credit card and information on a member shop to a virtual credit card system through a user terminal;

if the amount of purchase money, the purchasing term and the information on member shop are provided to the virtual credit card system, authenticating the member shop corresponding to the information on the member shop and a parent credit card corresponding to the virtual credit card, storing information on the amount of purchase money and purchasing term if the authentication is successful, and informing the user terminal of the authentication; and instructing the credit card reader installed in the member shop to print a sales slip containing purchasing particulars, after the authentication.

9. A virtual card service system comprising:

a user terminal for transmitting an amount of usage money and a using term for any one of a plurality of virtual cards from a user of a master card among a plurality of virtual cards assigned to one parent account or one parent credit card to the virtual card service system;

a virtual card system for receiving the amount of usage money and the using term for the selected virtual card from the user terminal, authenticating the parent account or the parent credit card corresponding to the master card, storing information on the amount of usage money and using term for the selected virtual card if the authentication is successful, and informing the user terminal of the authentication; and a card service machine for receiving an identifying information on the selected virtual card, verifying whether the information is within the using term stored in the virtual card system, and withdrawing or paying the amount of usage money.

10. The virtual card service system as claimed in claim 9, wherein the user terminal transmits the selected amount of usage money and the selected using term for the virtual card in question according to an authentication request from any one of the plurality of virtual cards.

11. A virtual card service method comprising the steps of:

transmitting a selected amount of usage money and a selected using term for any one of a plurality of virtual cards assigned to one parent account or one parent credit card from a user terminal of a master card to the virtual card service system;

receiving the amount of usage money and the using term for the selected virtual card from the user terminal, authenticating the parent account or the parent credit card corresponding to the master card, storing information on the amount of usage money and using term for the selected virtual card if the authentication is successful, and informing the user terminal of the authentication; and receiving identifying information on the selected virtual card, verifying whether the information is within the using term stored in the virtual card system, and withdrawing or paying the amount of usage money.

12. The virtual card service method as claimed in claim 11, wherein the user terminal transmits the selected amount of usage money and the selected using term for the virtual card in question according to an authentication request from any one of the plurality of virtual cards.

* * * * *